US005574804A

United States Patent [19]
Olschafskie et al.

[11] Patent Number: 5,574,804
[45] Date of Patent: * Nov. 12, 1996

[54] HAND-HELD SCANNER

[76] Inventors: Francis Olschafskie, 46 Atherton St., Boston, Mass. 02119; Allan Chasanoff, 117 E. 36th St., New York, N.Y. 10016

[*] Notice: The term of this patent shall not extend beyond the expiration date of Pat. No. 5,301,243.

[21] Appl. No.: 161,762

[22] Filed: Dec. 2, 1993

Related U.S. Application Data

[63] Continuation-in-part of Ser. No. 901,004, Jun. 19, 1992, Pat. No. 5,301,243, which is a continuation-in-part of Ser. No. 632,144, Dec. 21, 1990, abandoned.

[51] Int. Cl.$^6$ .............................. G06K 9/22; G06K 7/10
[52] U.S. Cl. ..................... 382/313; 382/314; 235/472; 358/473
[58] Field of Search ...................... 382/59, 313, 314, 382/318; 358/473; 235/472; 345/165, 166

[56] References Cited

U.S. PATENT DOCUMENTS

| | | | |
|---|---|---|---|
| 3,541,248 | 11/1970 | Young | 178/6.6 |
| 3,918,028 | 11/1975 | Humphrey et al. | 340/146.3 |
| 3,947,817 | 3/1976 | Requa | 340/146.3 |
| 3,993,865 | 11/1976 | Browne et al. | 382/59 |
| 4,048,617 | 9/1977 | Neff | 340/146.3 |
| 4,158,194 | 6/1979 | McWaters et al. | 340/146.3 |
| 4,180,204 | 12/1979 | Koenig et al. | 235/385 |
| 4,475,240 | 10/1984 | Brogardh et al. | 382/59 |
| 4,490,852 | 12/1984 | Sahni | 382/59 |
| 4,523,235 | 6/1985 | Rajchman | 382/59 |
| 4,800,444 | 1/1989 | Suzuki et al. | 358/294 |
| 4,817,185 | 3/1989 | Yamaguchi et al. | 382/59 |
| 4,818,856 | 4/1989 | Matsushima et al. | 235/472 |
| 4,887,165 | 12/1989 | Sato et al. | 358/474 |
| 4,947,261 | 8/1990 | Ishikawa et al. | 358/473 |
| 5,012,349 | 4/1991 | de Fay | 358/296 |
| 5,063,508 | 11/1991 | Yamada et al. | 364/419 |
| 5,083,218 | 1/1992 | Takasu et al. | 358/473 |
| 5,121,226 | 6/1992 | Kubota et al. | 358/473 |
| 5,126,543 | 6/1992 | Bergeron et al. | 235/472 |
| 5,247,170 | 9/1993 | Cardew | 235/472 |
| 5,301,243 | 4/1994 | Olschafskie et al. | 382/59 |
| 5,355,146 | 10/1994 | Chiu et al. | 358/473 |
| 5,365,605 | 11/1994 | Hosogoe et al. | 382/313 |
| 5,410,141 | 4/1995 | Koenck et al. | 235/472 |

OTHER PUBLICATIONS

*From Fax to Finish—Scanners Build a Better Image* PC Magazine, Mar., 28, 1989.
*Buyer's Guide—Scanners under $1,000* Tom Badgett and Corey Sandler, Computer Shopper, Jul. 1990.
*It's The Casio Copy Pen*, Casio Product Information.

*Primary Examiner*—Jose L. Couso
*Assistant Examiner*—Matthew C. Bella
*Attorney, Agent, or Firm*—Bromberg & Sunstein

[57] ABSTRACT

A scanner for reading characters from a string of characters recorded on a substrate. The scanner includes a character scanner that is used with a stroking motion parallel to the string of characters that permits the user to view the line being scanned as the scanner is moved across the page. A line-by-line scanner with a wide area of view may be mounted along the side of the scanner to be used in scanning a page or column on a line-by-line basis. The character scanner may include a lens of variable magnification so as to accommodate variable size print. A microphone mounted on the scanner permits the input of voice sound information. The scanner may be in communication with a computer through a cable or a wireless transmitter/receiver. The value of each pixel detected by the scanner is determined by comparing the light reflection value with a threshold that is adjusted in accordance with the values of pixels detected and averaged over previous frames. The hand-held scanner may be housed in any elongate housing for pen-like use or in a palm-held housing such as a typical mouse. An image splitter may be included within the optics to generate two separate images for separate character recognition processing.

37 Claims, 7 Drawing Sheets

HAND-HELD SCANNER

This application is a continuation-in-part of application Ser. No. 07/901,004 (the "Parent Application"), filed Jun. 19, 1992, now U.S. Pat. No. 5,301,243, which is a continuation-in-part of application Ser. No. 07/632,144, filed Dec. 21, 1990, now abandoned. The entire disclosures of these applications including text and drawings are hereby incorporated by reference herein.

TECHNICAL FIELD OF THE INVENTION

The invention relates generally to hand-held scanners and other data-input devices, and more specifically to hand-held scanners for scanning text.

BACKGROUND OF THE INVENTION

It was generally found in conventional hand-held scanners that the user's view of the string of characters surrounding the character being scanned is at least partially obstructed. As such, it can be difficult for users to aim a hand-held device. Numerous art scanners provide an optical window or LCD panel to view the material directly under the scanner. However, the user must then look at the window and the characters on the page at the same time to properly aim the scanner across the line of characters. Other scanners have been known to provide no viewing capability of the characters beneath the scanner at all.

U.S. Pat. No. 4,800,444 (Suzuki et al.) discloses the use of the scanner with an optical window on the side of the device that faces the user. The user is required to aim the device, held sideways, along the character string while simultaneously viewing the material under the device in the optical window. U.S. Pat. No. 5,012,349 (deFay) discloses a scanner with an LCD panel fitted into the handle. This device must be preset for narrow character heights and rolled sideways directly over the character string. U.S. Pat. No. 3,541,248 (Young) discloses the use of a magnifying member on the scanner. Here, not only must the user view two areas including the window and the character string on a paper, but also the user will experience distortion of the optically viewed materials. U.S. Pat. No. 4,947,261 (Ishikawa et al.) discloses a scanner that should be held vertically over the characters in order to read them into the scanner. No assistance is provided for viewing the material beneath the scanner. The scanner may be equipped with interchangeable lenses having different focal lengths for achieving various magnifications. U.S. Pat. No. 5,083,218 (Takasu et al.) discloses another scanner that is held vertically over the characters to be scanned.

SUMMARY OF THE INVENTION

A hand-held scanner is provided for reading characters from a string of characters recorded on a substrate. The housing of the scanner is shaped so that it may be held like a pen and conveniently moved, in contact with the substrate, along the substrate so as to scan the string of characters. Movement of the scanner across the surface of the substrate is sensed by a sensor. An optical system, located within the housing, uses a small area of the substrate and an optical detector detects the relative intensity of light reflected from each of several points in the area of view. The area of view is advantageously clearly visible to the user and unobstructed by the scanner while being used for scanning. The string of characters adjacent to the area of view is also clearly visible while using the scanner of the invention.

An embodiment of the scanner of the present invention further provides multiple inputs of information. For example, a microphone mounted on the hand-held scanner converts voice and other sound signals into electrical signals for recording. The scanner may also be provided with a wide area scanner that can be used for scanning an entire page. The wide-area scanner may be a four-inch scanner stored in the handle of the hand-held scanner which is used by placing the scanner sideways on the substrate and scanning over the page line by line.

Another embodiment of the scanner of the present invention includes optics for producing two images encompassing one area of view. This may be accomplished with an image splitter which preferably rotates the two images with respect to one another. The optical detector generates electrical signals in response to each of the two images. By applying optical character recognition software to the two images in a host computer, the reliability of character recognition is improved. Instead of using a wheel to track the position of the scanner along the substrate, a ball rotatably mounted in the housing may be used to provide movement information in two directions. While only one direction is needed for scanning a horizontal line of characters, the scanner can be advantageously switched into a mouse mode for controlling the movement of a cursor on a host computer.

A further embodiment of the invention includes an automatically adjustable threshold for distinguishing between the substrate and the characters on the substrate. The intensity threshold is continuously reset in response to the relative intensities of light detected in the plurality of points in the area of view of the scanner. A still further embodiment of the invention includes the use of an optical lens with an adjustable magnification. This permits the user to zoom in on small print as the substrate is being scanned. A still further aspect of the invention is the provision of wireless communication means within the scanner so that the scanner need not be connected by a cable to the host computer.

Other objects and advantages will become apparent during the following description of the presently preferred embodiment of the invention taken in conjunction with the drawings.

DETAILED DESCRIPTION OF THE PREFERRED EMBODIMENTS

The invention provides a hand-held, pen-like scanner 10 for note taking, i.e., acquiring textual information from written and printed sources. The scanner is capable of reading and storing selected information, for example, some or all of the characters from a given line of text. The scanner has a scanner head at its front end having an area of view sized for compatibility with printed characters having conventional point sizes. An embodiment of the scanner of the invention may be advantageously provided with a lens of variable magnification to accommodate a wide range of point sizes. The scanner 10 is stroked along adjacent a line of text, so that each character in turn is partially in the area of view. In this way the area of view accomplishes a succession of substantially vertical slices of each character. In accordance with another embodiment of the present invention, an optical image splitter is provided in the scanner to rotate the area of view so that additionally and simultaneously a horizontal slice may be taken from the character and recorded. Each slice or frame is stored in a series of digital data records. The digital records may be transferred over a cable connected to the scanner or in accordance with the present invention by using a wireless transmitter from the scanner to the host computer. A computer equipped with OCR (Optical Character Recognition) software can transform the succession of digital records into an ASCII text file.

Figure 1:
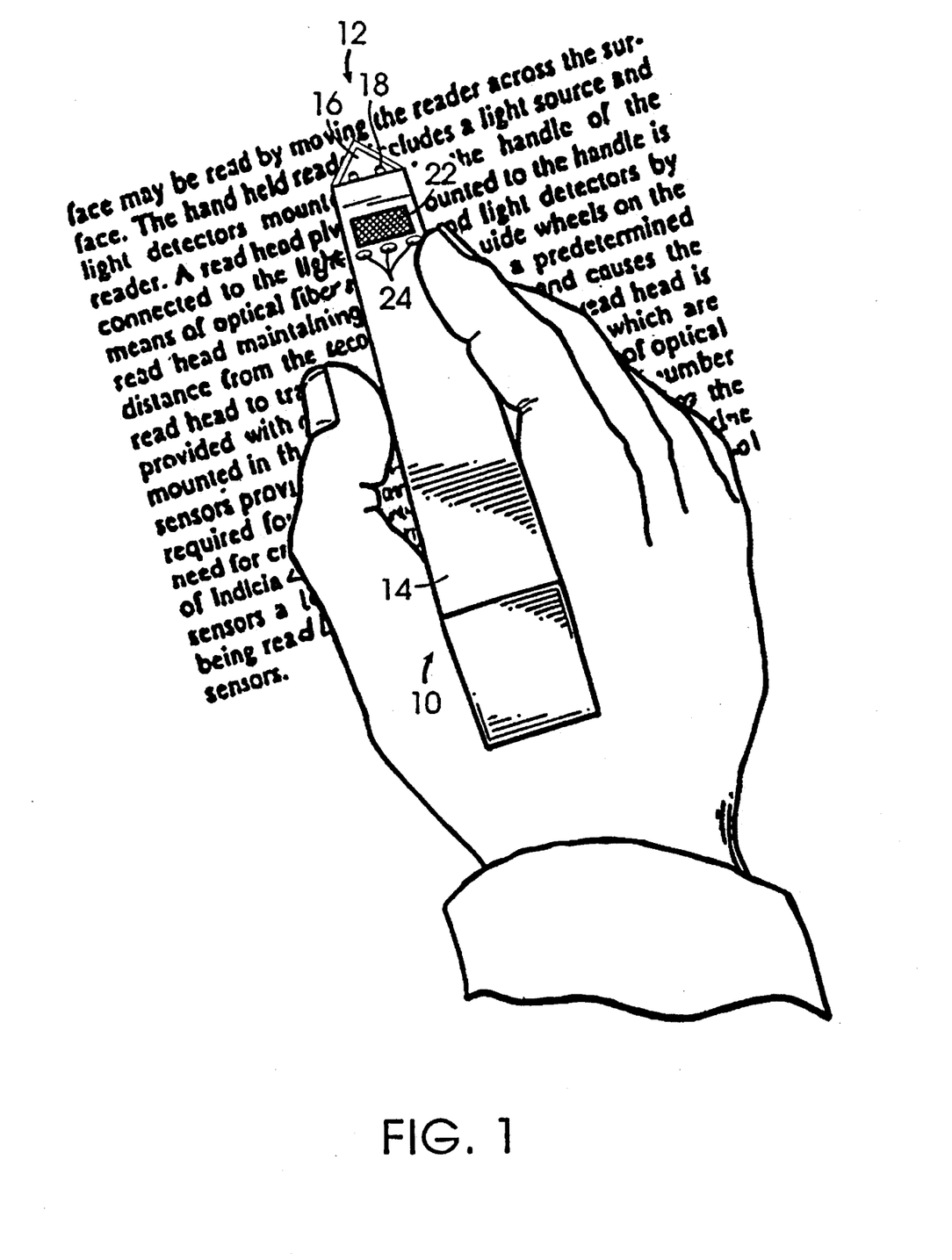
FIG. 1 is a general view of a hand-held scanner of the invention being used to scan a line of text.

Referring now to FIG. 1, a scanner 10 of the present invention is illustrated. The scanner may be used in its character-by-character mode, in which it scans a line of characters on a substrate 12 (e.g., paper) while the scanner is held like a pen underlining that line. The housing 14 of the scanner is elongate in shape in order to allow the scanner to be held like a pen. Moreover, because the scanner is sized and shaped like a pen, it can be used as a pen or a pointing device for pen computing when connected to an appropriate host computer.

The scanner housing 14 has an opening 16 or window through which a light-detector 20 receives the light reflected off of the substrate 12. A light source, for example a pair of lights 18, may be used to direct light onto that portion of the substrate 12 which is being read by the scanner. Ambient light or a single light source may in many cases be sufficient. The lights 18 may be a pair of light emitting diodes. The area of view illuminated by the lights 18 is visible to the user above the front tip of the scanner 10. The entire line being scanned is visible during scanning as shown in FIG. 1.

The character-by-character mode of the scanner may be provided with a zoom capability to allow the scanner to read all point sizes normally encountered on a printed page. The zoom capability may be provided either by an internal multi-element lens configuration adjusted electronically through a motor to read wide or long or by a zoom lens attachment to be affixed to the tip of the scanner.

A microphone 22 may be incorporated into the scanner 10. The microphone 22 records comments spoken by the user of the scanner. The analog recording of the spoken comments may be transmitted from the scanner to a host computer or a recorder. The computer may be provided with a speech recognition processor and/or a digital recorder. A cable may be used to attach the hand-held portion of the scanner 10 to the host computer. Alternatively, in accordance with an embodiment of the present invention, the scanner 10 may be provided with wireless communication capability for transmitting and receiving. The wireless connections can be made with radio frequency (rf) or infrared (IR) radiation to transmit digital signals to a host. The wireless capability eliminates the need for a cable and greatly increases the scanner's transmission range and flexibility of operation. Electrical signals representing the spoken comments and/or the scanned characters are sent along the cable or through a wireless connection to the host processing components. The microphone 22 allows the user of the scanner to annotate what is being scanned. For instance, the user may be researching in a library. When the researcher finds an important passage in a book, he may wish to scan and save that passage for later reference. A series of control buttons 24 are provided on top of the scanner 10. One of these buttons 24 is operable to switch the scanner 10 from character scanning mode to microphone mode. By using the microphone, the researcher may record the source of the scanned passage, i.e., the title and author of the book and the page the passage was located, as well as the researcher's thoughts regarding the passage. If a speech-recognition processor is used, the researcher may later view his comments on a computer terminal along with the scanned passage. If a speech-recognition processor is not used, and instead the spoken comments are simply recorded, the researcher may listen to the comments later.

Figures 2, 3, 4:
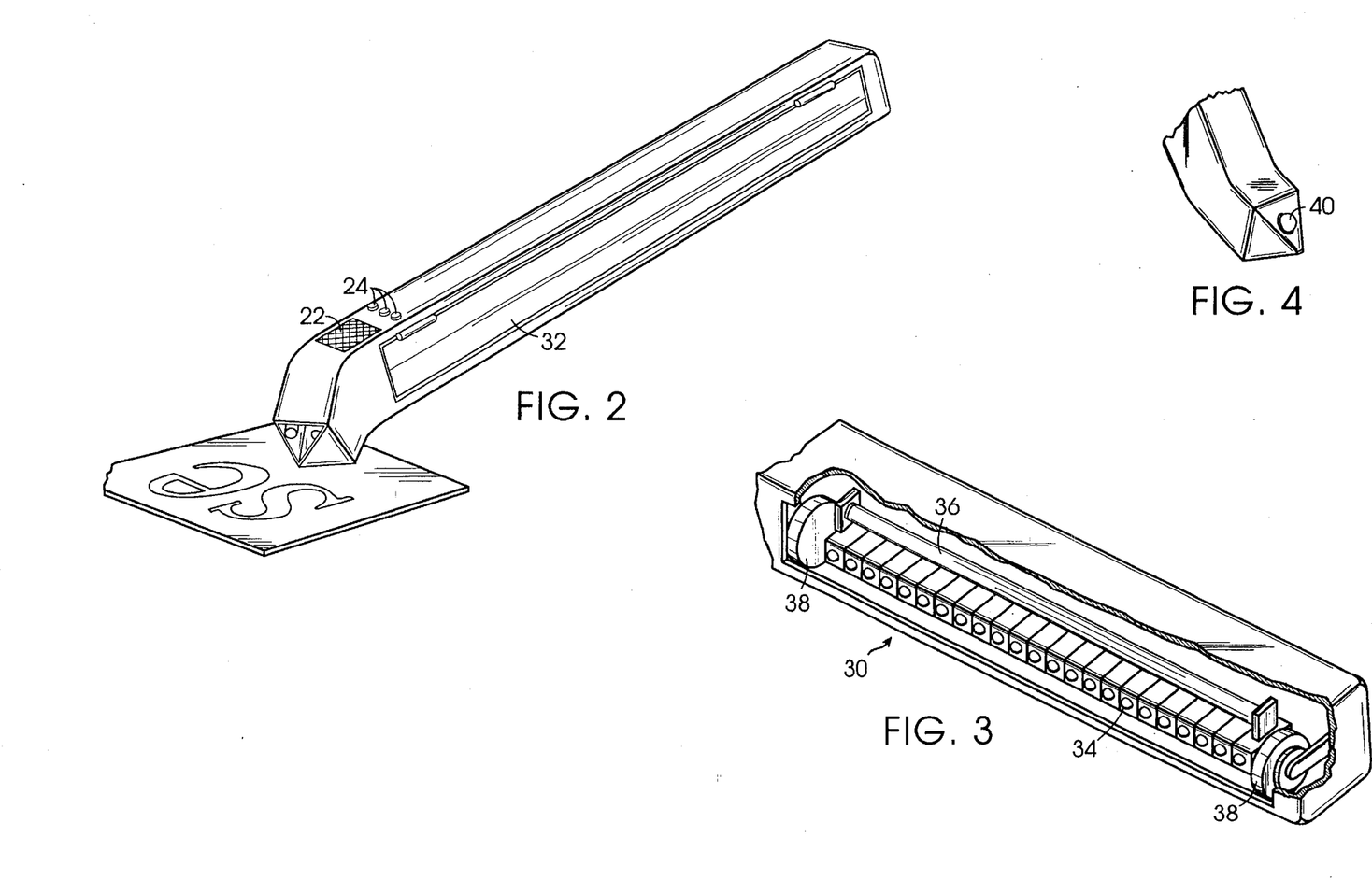
FIG. 2 is an isometric view of the hand-held scanner of the invention.
FIG. 3 is a cut-away view of the door on the handle of the scanner of FIG. 2.
FIG. 4 is a partial isometric bottom view of the front end of the scanner of FIG. 2.

Referring now to FIGS. 2 and 3, an embodiment of the scanner also includes a line-by-line scanner 30, such as a four-inch-wide scanner. This line-by-line scanner is located along the length of the elongate housing 14. A flap 32 is mounted along the length of the housing 14 so that when the flap is opened, the side of the scanner may be placed adjacent the substrate 12 at the top of a passage to be scanned. The scanner is then drawn over the page. This is repeated as many times as necessary to cover the whole page. Software in the host computer may be provided to piece together images obtained from multiple sweeps across a page to produce a readable ASCII file of the text on the page. Columns less than four inches in width can be scanned in a single sweep down the page. The line-by-line scanner obliterates the lines from view as they are scanned, but since a large body of text covering a page or column is being scanned there is little need for the user to follow along as with the character-by-character scanner. The line-by-line scanner is more efficient for scanning longer passages than the character-by-character scanner. Also, the line-by-line scanner may be used in scanning non-textual continuous-tone images. When a continuous-tone image is scanned, the bit map of information detected by the scanner is stored for later retrieval and display. When characters are scanned, a character-recognition processor is preferably used in order to convert the character information into ASCII or similar format. The flap 32 may be attached to a switch in order to indicate that the line-by-line scanner is in use and to turn off the character-by-character scanner as well as to signal to the host computer which mode is in use.

As shown in FIG. 3, the line-by-line scanner includes a linear array of photodiodes 34 for detecting the intensity of light reflected from the substrate. The photodiodes do not require optical lenses for directing the light. Instead of photodiodes, alternative photodetectors such as CCD's with associated optics may be used. A light source 36 produces the light for reflection off the substrate. The light source 36 may be fluorescent. Encoder wheels 38 may be spring mounted behind the sliding door 32 so that they extend out from the scanner when the door is opened to reveal the line-by-line scanner. The encoder wheels provide location signals for coordinating with the image information so that the shapes of the characters being scanned are not adversely influenced by the speed with which the scanner is moved across the substrate. A data frame is captured from the photodiodes 34 and stored in response to movement of the scanner a predetermined distance, such as every ⅓₀₀ of an inch, as detected by the encoder wheels 38.

An encoder wheel may also be mounted beneath the front tip of the scanner for use with the character-by-character scanner. In accordance with an embodiment of the present invention, the encoder wheel is replaced by a ball rotatably mounted in the scanner housing 14 as shown in FIG. 4. The ball 40 can be used to track the movement of the scanner across the substrate, in the same way that a ball in a computer mouse tracks the movement of the mouse. Unlike a wheel, the ball 40 is able to track movement in two dimensions. By using an encoding ball 40 instead of a wheel, the scanner may be used as a mouse for a personal computer, when not functioning as a scanner. One of the buttons 24 may be used to switch from scanning mode to mouse mode. Instead of using the buttons 24 on the scanner itself, the mode of the scanner may be switched by interacting with software designed for that purpose on the host computer. In mouse mode, movement along orthogonal coordinates will both be detected by an X movement sensor and a Y movement sensor. Only movement along one coordinate is detected in the scanning mode to track movement along a line of text. When rotational movement of the encoding ball 40 stops, when it is lifted up at the end of a line for instance, the scanner stops sending the scanning data. The computer may respond, if so programmed, to a stop in data by inserting a single soft carriage return.

The line-by-line scanner 30 may be located on the same side of the scanner housing as the encoding ball so that the encoding ball can be Used to provide information regarding the movement of the scanner in both its character-by-character and its line-by-line modes. As such the encoding wheels 38 may be eliminated. Alternatively, an internal clock may be set for a standard rate of scanning. Such an internal clock may be used in either of the line-by-line or character-by-character modes, in lieu of an encoding wheel or ball. By using the internal clock, the scanner reads x samples per second regardless of how quickly the scanner is moved across the substrate 12. The character-recognition processor can recognize the characters being scanned as long as the scanner is moved at a speed within a range around the speed at which the scanner is set. Such an internal timing device may be arranged in parallel with an wheel-encoder-based system.

Figure 5:
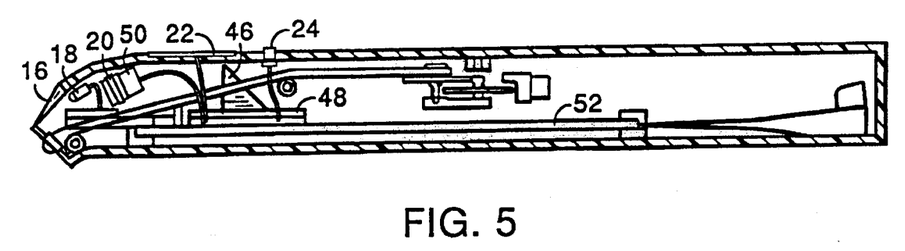
FIG. 5 is a cut-away view of the scanner of FIG. 2 illustrating the components relative to the optical scanner at the front tip of the hand-held scanner.

Referring now to FIG. 5, the optics for the character-by-character scanner shall be described in greater detail. A pair of lights 18 which may be LED's are located on the top front-end of the scanner for shining light through the opening 16 onto the substrate. Light reflected from the substrate is viewed through optical lens 20. Lens 20 may be multi-element lens that permits variable magnification. A motor 50 is provided for adjusting the lens 20 to vary its magnification. The motor 50 is electrically connected to a circuit board 52 which includes the circuitry for controlling the operation of the motor in response to user inputs either from the control buttons or through the host computer.

Figure 7:
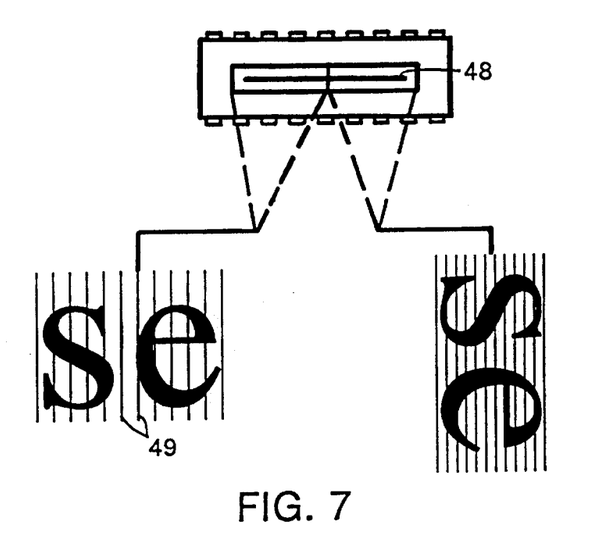
FIG. 7 is a diagram illustrating the production of two images for detection by the optical detector of a scanner of the invention.

The area of view on the substrate may be separately focused to produce two images of the same area. In accordance with an embodiment of the present invention, an image splitter receives the focused image to then produce two separate images. Image splitter 46 is illustrated in FIG. 5 as a prism for illustration purposes. Conventional optical image splitters appropriate for carrying out the functions of the present invention may be inserted in the scanner to achieve the objects and functions of the invention. A first image produced by the image splitter 46 is projected on a detector 48. The projection of the first image may be arranged on half of detector 48. The other half of detector 48 may be for the second image from the image splitter 46. Alternatively, a first detector may be included for receiving the first image and a second detector may be included for receiving the second image. Image splitter 46 preferably rotates the first image to produce the second image. The image is preferably rotated 90 degrees. Thus, in the first image vertical slices are taken through the characters being scanned as shown in FIG. 7. The rotated image projected on detector 48 causes a horizontal slice to be taken through the characters. Accommodation is made in the optics and the software to index the horizontal slices all the way across each of the characters. The pixel information obtained in the vertical slices and the horizontal slices differs enough so that the two sets of information can both be used by character recognition software in the host computer to more accurately identify each of the characters.

It has been found that breaking the character up into horizontal lines often provides more reliable character recognition. The host computer may be provided with two different character recognition software programs running concurrently. Each program can be instructed to analyze each of the two images resulting in four determinations that can be compared to arrive at the most likely correct identification for each character. If most methods provide the same character, then that character is used. If one or more methods could recognize a character, while the other methods could not, then the recognized character is used. If the methods provide different characters, then the processor compares the strings of characters developed by the methods. For instance, one method may provide the string of characters "dog," while another method provides the string "doy." Both strings are compared to a list of known words, much like the spell-check feature of a word processor, and the string that matches a known word, e.g., "dog," is selected.

Figure 6:
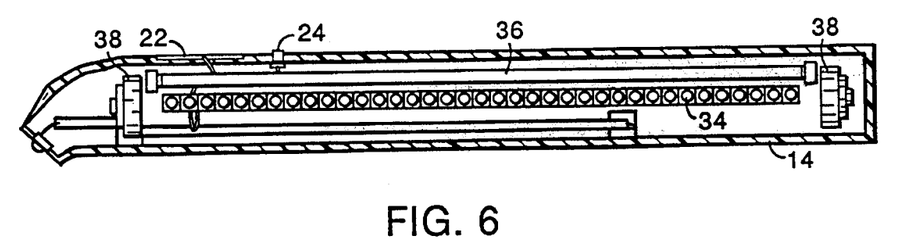
FIG. 6 is a cut-away view of the scanner of FIG. 2 emphasizing the long scanner mounted behind the door of the scanner in FIG. 2.

Referring now to FIG. 6, the line-by-line scanner is shown positioned within the scanner housing 14. The line-by-line scanner is shown with a linear array of photodiodes as the light detector. Alternatively, the line-by-line scanner may be provided with optical means for focusing the image viewed by the scanner onto an optical detector. For example, it may be possible to focus the image onto detector 48 so that only a single detector may be shared by both the character scanner and the line scanner.

Figure 8:
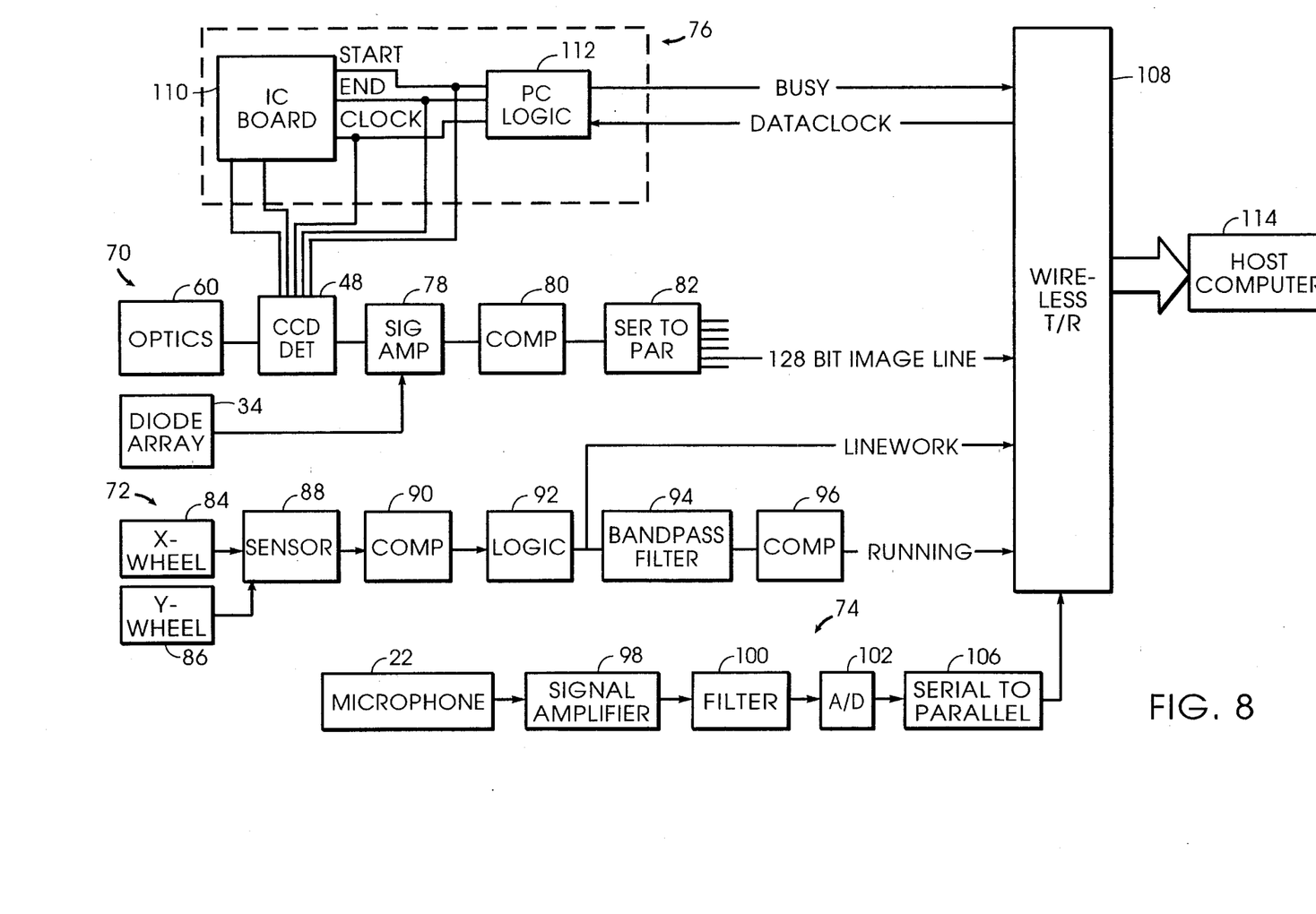
FIG. 8 is a block diagram of the functional components of the scanner of FIG. 2.

FIG. 8 is a functional block diagram of the major components of the scanner. The major elements include the light intensity measurement system 70, the movement detection system 72, the sound detection system 74 and the control and synchronization system 76. The light intensity measurement system includes the optics 60, the optical detector 48, the photodiode array detectors 34, a signal amplifier 78, an output TTL comparator 80, and a serial to parallel converter 82. The movement detection system includes an X-wheel 84 and a Y-wheel 86. These wheels are rotated by the movement of the ball 40 in the manner typical of a computer mouse. Movement detection system further includes a movement sensor 88 associated with each of the X and Y wheels, a wheel sensor comparator 90 for each wheel, wheel sensor logic 92, a band pass filter 94 and a second wheel sensor comparator 96. The sound detector system includes the microphone 22, a signal amplifier 98, and a serial to parallel converter 106. The control and synchronization system includes an IC board 110, a video/pc logic 112 and a digital IO card 108, an off the shelf board mounted within the host computer 114. Each of these systems will now be discussed in turn.

LIGHT INTENSITY MEASUREMENT SYSTEM

The detector 48 is an EG&G CCD array in the presently preferred embodiment with 128 pixels covering 0.25 inch (0.635 cm.). In a preferred embodiment, a first 64 pixels is used to detect a first image and a second 64 pixels is used for detecting a second image obtained from the image splitter. The output from the detector 48 is amplified and fed into a comparator 80 and then a serial-to-parallel converter 82. A field stop is used to limit the image projected onto the detector.

An IC board 110 has a "boxcar" style output. The signal amplifier 78 is located on the IC board 110, within the housing to insure good electronic transmission. The IC board 110 provides the proper voltages and control signals for the CCD detector 48, generates clock phases and amplifies and translates the CCD output signal. The output of the IC board 110 consists of three control signals, namely, a pixel clock, a start of frame signal and an end of frame signal, and one analog signal which is the sampled and held CCD output byte. After a start of frame (and before the end of frame), the analog output is sampled on the rising edge of the pixel clock to insure accurate data. This same IC board can be connected to control the photodiode array 34 in the wide scanner in addition to the character scanner.

The output TTL comparator is used to convert each sampled and held analog signal from the IC board into a binary indication of light. The comparator has an adjustably settable threshold. The output of the comparator is a TTL compatible serial data stream, a stream of 128 pixels out of the CCD array. These bytes contain the data from the viewed image.

Sixteen serial in/parallel out shift registers are used to capture this data stream. The serial bytes are clocked with a gated pixel clock which is only active between a start of frame and an end of frame, and corresponds to one clock every other pixel. The parallel output of the serial to parallel converter is used as the digital data for the software.

MOVEMENT DETECTION SYSTEM

Each of the X-wheels and Y-wheels frictionally engage the ball 40. Movement of the scanner normal to the elongate housing is detected by the X-wheel 84. Movement orthogonal to the X-wheel direction is detected by the Y-wheel 86. This is the conventional arrangement for a computer mouse. When the scanner is in a character-by-character scanner mode, only the X-wheel is providing information that is used and passed along by the system. The data from the Y-wheel is switched off.

The wheel sensor 88 output is used to synchronize scanning at predetermined intervals along the character string. The output of the sensor 88 is used to initiate scans at intersection lines 49 along the character string as shown in FIG. 7. When the scanner is moved across the surface of the substrate so that the X-wheel rotates and the wheel sensor detects the rotation, then comparator 90 and logic 92 generate a square wave. A differential amplifier, not shown, but located between the sensor 88 and the comparator 90, amplifies the wheel sensor's output to generate a signal large enough to drive wheel sensor comparator 90. The wheel sensor comparator uses hysteresis to detect pulses from the wheel's sensor, translates these pulses into fixed amplitude pulses and toggles a flip-flop to provide a 50% duty cycle signal, or square wave. A change of state of this square wave indicates a displacement of the scanner across the substrate of 1/30th of an inch (0.0847 cm.). The square wave is further filtered by a band pass filter 94 (high pass filtered, rectified then low-pass filtered) to yield a signal that is fed into a second wheel sensor comparator 96 to detect motion and generate a RUNNING signal. As shown in FIG. 8, this process yields LINEWORK which triggers a RUNNING signal. These signals are fed via the wireless transmitter or a cable into the host computer and are used by the host computer software to generate data clock signals which control the timing of scanning via the IC board 110 to correspond to the intersection lines 49 of FIG. 7.

SOUND DETECTION SYSTEM

A microphone 22 receives sound signals when it is activated and converts them into electrical signals. A signal amplifier 98 prepares the signals for processing. The signals are processed in a conventional manner in order to provide a digitized recording of the sound detected by the microphone 22. In FIG. 8, filter 100 and A/D converter 102 are representative of the conventional sound processing components. The digitized sound signal is passed through a serial to parallel converter 106 then to the wireless transmitter/receiver 108. The wireless transmitter/receiver 108 is used to communicate back and forth with the computer. Alternatively, a cable connection can be implemented between the I/O card and the computer. The digitized sound may be used by the computer as a recording which may be played back or alternatively voice recognition capability may be implemented by the computer to convert the digitized sound into an ASCII text file.

CONTROL, DISPLAY AND SYNCHRONIZATION SYSTEM

An off-the shelf digital I/O board, located within the host computer, is used to accept the digital data from the movement sensor, optical system and sound system. The basic software in the host computer detects motion by monitoring the RUNNING signal. When the RUNNING signal is active, the pen is moving and scans are initiated. Software in the host computer monitors the BUSY signal from the PC logic 112. To determine when to upload the contents of the image buffers in the serial-to-parallel converter 82. When the BUSY becomes inactive, the software uploads the data. This data includes the binary image, as well as the speed sensor SYNCH signal. Typically, data will be read at a rate faster than 300 frames per inch (118 frames per cm.), although the SYNCH signal will only signal 1/30th of an inch (0.0847 cm.).

Software in the host computer processes the raw data for storage or display by the host computer. For every change in the SYNCH signal (representing 1/30th of an inch or 0.0847 cm.), the software compresses the data such that there are 10 frames worth of data for each SYNCH transition (1/300th of an inch or 0.00847 cm.). This off-line processing yields the required resolution of 1/300th inch (0.00847 cm.), without requiring a speed sensor with so fine a grain.

Once the raw data has been compressed, and perhaps displayed, the software can perform additional data compression for storage to disc.

Figure 9:
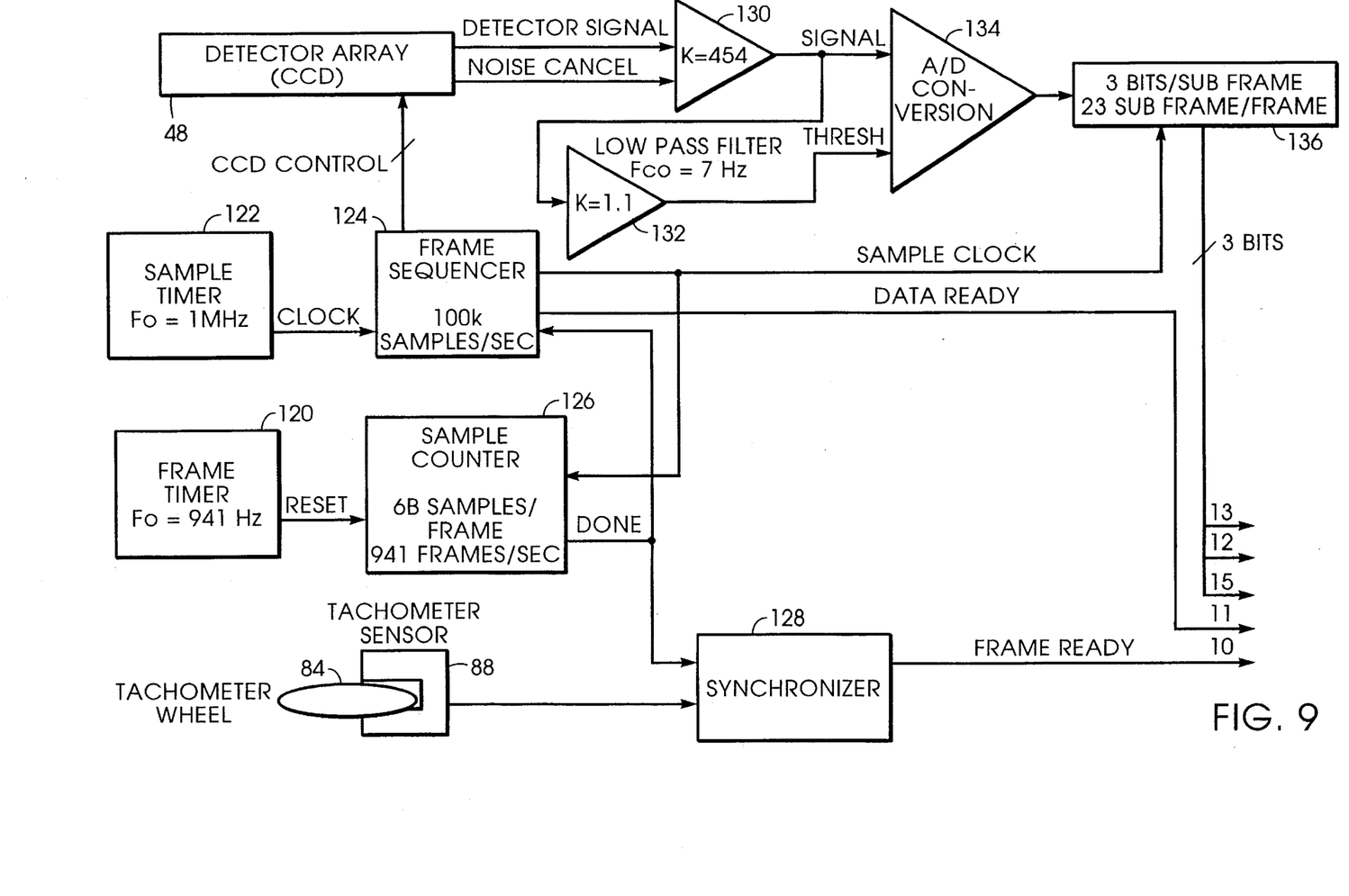
FIG. 9 is a more detailed block diagram illustrating the optical detector system and the movement sensor of the invention.

Referring now to FIG. 9, an alternative scheme for controlling the collection of image data is shown. A frame timer 120 issues clock signals at the presently preferred rate of 941 Hz to set an initial rate at which frames are sampled. A sample timer 122 generates a clock signal at the presently preferred rate of 1 MHz. This signal is divided down in a frame sequencer 124 to a presently preferred rate of 100 KHz. The frame sequencer 124 is used to time the sequential release of signals from the detector array 48. A sample clock output signal from the frame sequences is provided to a sample counter 126. The sample counter 126 also receives the frame clock from the frame timer 120. The sample counter combines these signals to periodically issue a DONE signal. The DONE signal is combined with the output of the X-wheel sensor 88 in a synchronizer 128. The synchronizer 128 issues a frame ready signal for each frame of bits that are to be sent to the host computer.

The bits output from the detector array 48 are analog signals. They are amplified by amplifier 130. A low pass filter 132 is used to set a threshold. The threshold is used in a comparator 134 to determine individually for each bit whether it is black or not black. The threshold setting filter 132 essentially averages the values of the bits over many samples and increases the average by about ten percent to set the threshold. The comparator 134 issues a digital signal for each bit. The bits are collected three at a time in a buffer 136 for delivery to the host computer. A data ready signal from the frame sequences 124 and a frame ready signal from synchronizer 128 are used to control the orderly delivery of the bits in the buffer 136 to the host computer. Several bits at the beginning and the end of each frame are used to indicate the beginning or end rather than to represent a pixel.

Figure 10:
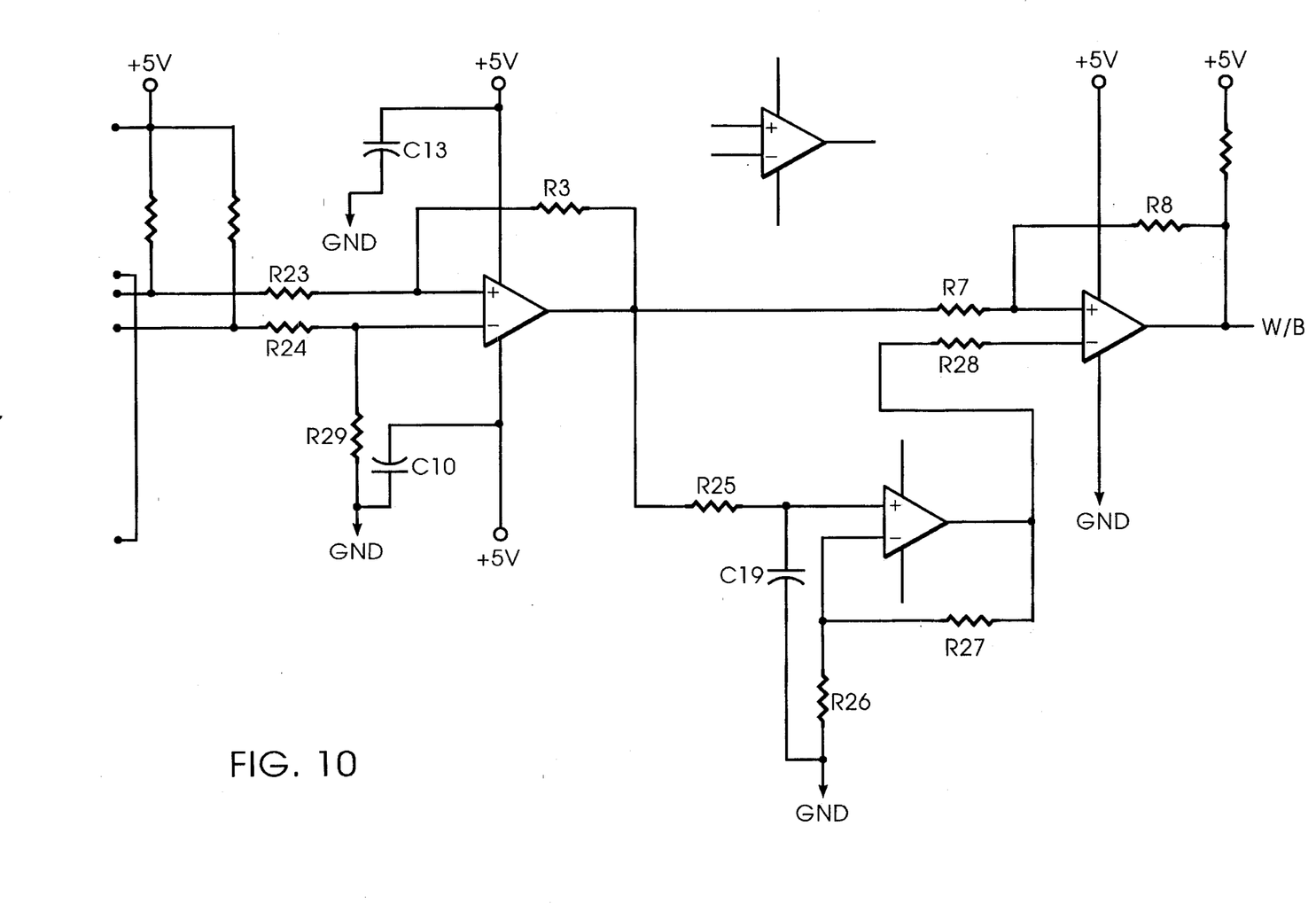
FIG. 10 is an electrical schematic of a threshold setting circuit of the scanner of the present invention.

Referring now to FIG. 10, a threshold setting circuit and comparator is shown in greater detail. This is only one of a variety of circuits that may be designed for achieving the same purposes and functions as described as follows. Using an analog switch, we take a sample right at the detector 48. When the switch is turned on, the sample is run into a capacitor. The capacitor holds it. Continually dumping pixels into the capacitor, the capacitor then creates an average. The pixels for a vertical line are determined by reading all 64 pixels over several vertical lines. We take an average of all the dark pixels in the line. This is done over several lines. Thus an average is also spread over a number of lines. Then by reducing the average slightly, we create a threshold. If a pixel has a darkness level to one side of the threshold, it is seen as black, when the pixel is on the other side of the threshold, it is seen as white. The threshold is continually updated as the value of an average dark pixel, or alternatively an average white pixel, changes over a series of lines. By providing a variable threshold, the present invention accommodates for the variation in print darkness that can especially be encountered in newspapers. Each pixel is individually compared to the threshold to produce a white or black bit.

Figure 11:
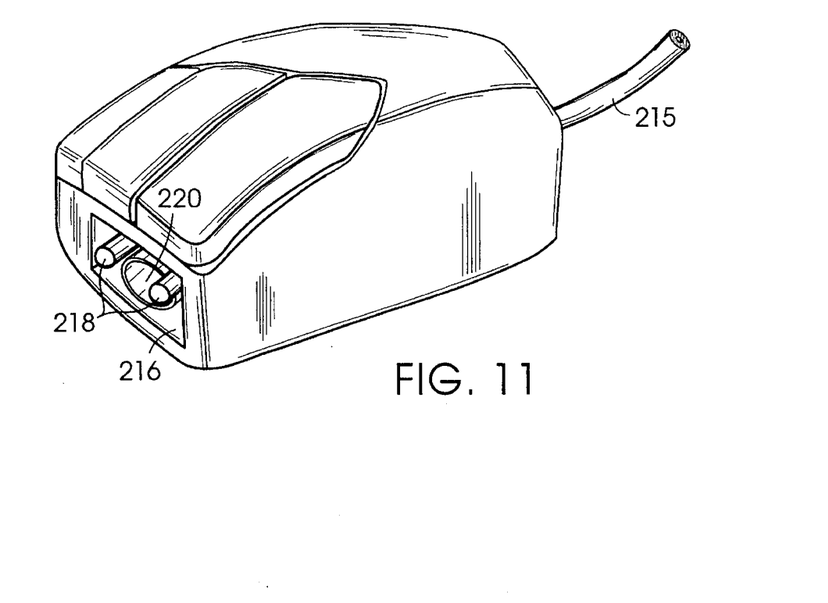
FIG. 11 is an isometric view of an alternate embodiment of a hand-held scanner of the present invention.
Figure 12:
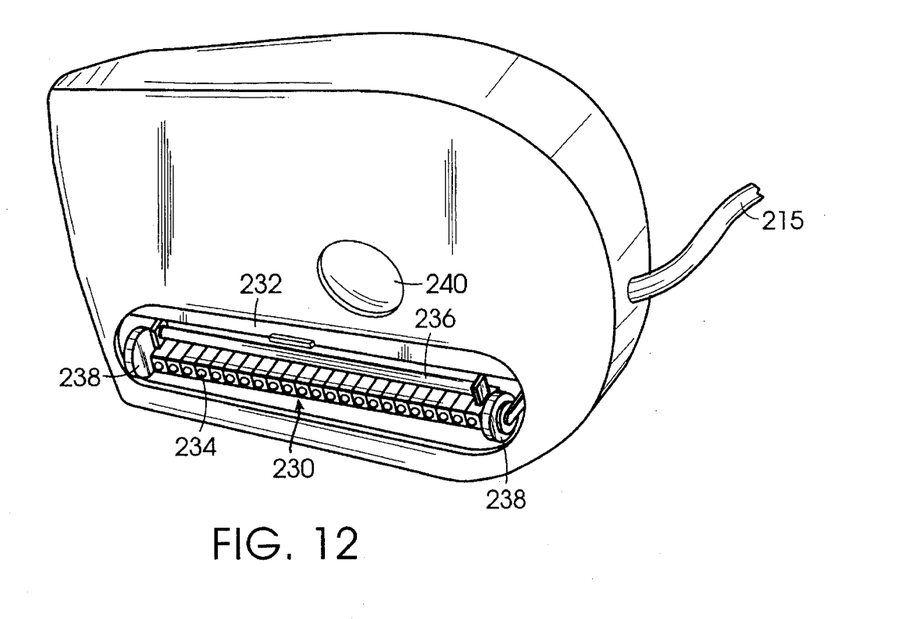
FIG. 12 is a bottom isometric view of the mouse/scanner of FIG. 11.

FIGS. 11 and 12 show an alternative embodiment of the invention, wherein the character-by-character scanner and line-by-line scanner are incorporated into a standard mouse housing. The window or opening 216 through which the character scanner reads the characters on the substrate may be located at any convenient point around the perimeter of the mouse, and is shown in FIG. 11 as being mounted at the front of the mouse. If the mouse includes a cable 215, it is preferably attached at the back of the mouse so as not to interfere with scanning. The lights 218 and the lens 220 are arranged behind the window or opening 216 for viewing an area in front of the mouse/scanner. This arrangement permits scanning with the user's hand in the same position on the mouse as during normal use of the mouse, and permits scanning of a line of characters without obstructing the user's view of any portion of the line, i.e., an "underlining" motion. As with the elongate housing version of the scanner, the mouse/scanner may be provided with a microphone, a threshold setting circuit, an image splitter, a wireless transmitter/receiver and/or a variable magnification lens.

A line-by-line scanner 230 may be mounted on the bottom side of the mouse housing. The bottom side of the mouse housing also accommodates the mouse ball 240 as in a standard computer mouse. A sliding door 232 may be provided to cover the line-by-line scanner 230 when not in use. The door 232 is mounted so that it can slide over to reveal the scanner. The scanner is provided with a pair of encoder wheels 238 that are spring mounted. When the door 232 is slid out of the way, the wheels emerge so as to provide movement data. The scanner itself includes a light source 236 and a photodiode array 234.

Of course, it should be understood that various changes and modifications to the preferred embodiments described above will be apparent to those skilled in the art. Such changes can be made without departing from the spirit and scope of the invention and without diminishing its attendant advantages. It is, therefore, intended that such changes and modifications be covered by the following claims.

We claim:

1. A hand-held scanner for reading characters arranged in a plurality of lines recorded on a substrate, the scanner comprising:

a housing having an elongate shape with a scanning end and a rear end;

first optical means for viewing a first area of view on the substrate adjacent the scanning end of said housing when said housing is oriented with respect to the substrate such that the scanning end of said housing is adjacent the substrate and the rear end of said housing is lifted off away from the substrate;

second optical means for viewing a second area of view on the substrate adjacent a side of said housing when said housing is oriented with respect to the substrate such that the side of said housing is adjacent the substrate, wherein a longest dimension of the second area of view is at least several times longer than a longest dimension of the first area of view; and optical detector means, located within said housing, for detecting relative intensity of light reflected from each of a plurality of points in one of the first and second areas of view;

wherein the scanning end of said housing is moved along a line of characters to read the characters through the first area of view and wherein the side of said housing is moved over the substrate line by line to read the characters through the second area of view.

2. The scanner of claim 1 further comprising first movement means, mounted proximate the scanning end of said housing, for detecting movement of the scanner across the substrate when the scanning end of said housing is moved along a line of characters to read the characters through the first area of view.

3. The scanner of claim 2 further comprising second movement means, mounted on the side of said housing, for detecting movement of the scanner across the substrate when the side of said housing is moved over the substrate line by line to read the characters through the second area of view.

4. The scanner of claim 1 further comprising a door mounted over the second optical means to selectively permit light to pass into said second optical means.

5. The scanner of claim 1 wherein said optical detector means comprises a CCD array for detecting light from a plurality of points in the first area of view and a photodiode array for detecting light from a plurality of points in the second area of view.

6. The scanner of claim 1 further comprising wireless communication means for communicating with a host computing means.

7. The scanner of claim 1 further comprising a microphone mounted on said housing and means for selectively activating said microphone.

8. The scanner of claim 1 further comprising means for adjusting the magnification of said first optical means and thereby change the size of the first area of view.

9. The scanner of claim 1 further comprising a comparator coupled to said optical detector means for receiving signals corresponding to the relative intensity of light from said optical detector means to determine whether each such signal is above or below an intensity threshold and means for setting the intensity threshold responsive to the relative intensities of points in an area of view being scanned.

10. The scanner of claim 1 further comprising an image splitter for producing two images of the first area of view, the two images being rotated with respect to each other and for providing the two images to said optical detector means.

11. A hand-held scanner for reading characters from a string of characters on a substrate comprising:

a housing adapted to be held and moved by a hand;

optical means, located within said housing, for viewing an image of an area on the substrate;

an image splitter for receiving the image of the area from said optical means and producing two images of the area wherein one of the two images of the area is rotated with respect to the other of the two images of the area;

optical detector means, located within said housing for detecting the relative intensity of light at a plurality of points in each of the two images and generating an electrical signal representative of the relative intensity of light in the plurality of points in each of the two images.

12. The hand-held scanner of claim 11 wherein said image splitter produces two images that are rotated 90 degrees with respect to each other.

13. The hand-held scanner of claim 11 wherein said optical detector means comprises a linear array of photodetector elements half of which receive the points from one of the two images and the other half of which receive the points from a second of the two images.

14. The hand-held scanner of claim 11 further comprising wireless communication means for communicating with a host computing means.

15. The hand-held scanner of claim 11 further comprising a microphone mounted on said housing and means for selectively activating said microphone.

16. The hand-held scanner of claim 11 further comprising means for adjusting the magnification of said optical means.

17. The hand-held scanner of claim 11 further comprising a comparator coupled to said optical detector means for receiving signals corresponding to the relative intensity of light from said optical detector means to determine whether each such signal is above or below an intensity threshold and means for setting the intensity threshold responsive to the relative intensities of points in at least one of the two images.

18. The hand-held scanner of claim 11 further comprising movement sensor means, mounted to said housing, for detecting movement of the scanner across the substrate.

19. A mouse/scanner for reading characters from a string of characters recorded on a substrate comprising:

a housing;

a ball rotatably mounted in said housing for rotational movement when said housing is moved over the surface of the substrate;

a first movement sensor, responsive to rotation of said ball about a first axis, for generating a first movement signal;

a second movement sensor, responsive to rotation of said ball about a second axis, for generating a second movement signal;

first optical means, located within said housing, for viewing an area of view outside of the projection of the housing's bottom face on the substrate, so that the user may view a field of view that includes the area of view;

optical detector means, located within said housing, for detecting the relative intensity of light reflected from each of a plurality of points in the area of view; and communication means, located in said housing, for sending any of the signals generated from said first movement sensor means, said second movement sensor means and said optical detector means to a host computing means.

20. The mouse/scanner of claim 19 further comprising a microphone mounted on said housing and wherein said communication means further includes means for sending signals generated from said microphone to the host computing means.

21. The mouse/scanner of claim 19 further comprising second optical means mounted on a side of said housing adjacent the substrate for viewing a line of characters beneath said mouse/scanner and a light source mounted on said mouse/scanner so as to illuminate the line of characters.

22. The scanner of claim 19 further comprising means for adjusting the magnification of said first optical means and thereby changing the size of the area of view.

23. The scanner of claim 19 further comprising a comparator, coupled between said optical detector means and said communication means, to receive signals corresponding to the relative intensity of light from said optical detector means to determine whether each such signal is above or below an intensity threshold and means for setting the intensity threshold responsive to the relative intensities of points in the area of view being scanned.

24. A hand-held scanner for reading characters from a string of characters recorded on a substrate, comprising:

a housing, being adapted such that the scanner may be conveniently moved over the substrate surface, along the string of characters, the housing having a bottom face adjacent the substrate, the bottom face forming a projection on the substrate;

first optical means, located within the housing, for viewing a first area of view;

optical detector means, located within the housing, for detecting the relative intensity of light reflected from each of a plurality of points in the first area of view;

wherein the housing is further adapted such that the first area of view is outside of the projection of the housing's bottom face on the substrate, so that the user may view a field of view which includes the first area of view, and such that the field of view is entirely unobstructed by the housing in at least one direction along the string of characters from the first area of view, so as to facilitate tracking.

25. The hand-held scanner of claim 24 further comprising second optical means for viewing a second area of view on the substrate adjacent a side of said housing when said housing is oriented with respect to the substrate such that the side of said housing is adjacent the substrate, wherein a longest dimension of the second area of view is at least several times longer than a longest dimension of the first area of view.

26. The hand-held scanner of claim 25 wherein said housing is adapted to be held by a user in the manner of a pen.

27. The hand-held scanner of claim 24 further comprising first movement sensor means, mounted to said housing, for detecting movement of the scanner across the surface of the substrate.

28. The hand-held scanner of claim 27 further comprising second movement sensor means for detecting movement orthogonal to the movement detected by said first movement sensor means.

29. The hand-held scanner of claim 24 further comprising a microphone mounted on said housing and means for selectively activating said microphone.

30. The hand-held scanner of claim 24 further comprising means for adjusting the magnification of said first optical means.

31. The hand-held scanner of claim 24 further comprising a comparator coupled to said optical detector means for receiving signals corresponding to the relative intensity of light from said optical detector means to determine whether each such signal is above or below an intensity threshold and means for setting the intensity threshold responsive to the relative intensities of points in the first area of view.

32. The hand-held scanner of claim 24 further comprising an image splitter for receiving an image of the first area of view from said optical means and for producing two images of the first area of view, the two images being rotated with respect to each other and for providing the two images to said optical detector means.

33. The hand-held scanner of claim 24 further comprising wireless communication means for communicating with a host computing means.

34. A hand-held scanner for reading characters arranged in a plurality of lines recorded on a substrate, the scanner comprising:

a housing having an elongate shape with a scanning end and a rear end;

first optical means for viewing a first area of view on the substrate adjacent the scanning end of said housing when said housing is oriented with respect to the substrate such that the scanning end of said housing is adjacent the substrate and the rear end of said housing is lifted off away from the substrate;

second optical means for viewing a second area of view on the substrate adjacent a side of said housing when said housing is oriented with respect to the substrate such that the side of said housing is adjacent the substrate, wherein a longest dimension of the second area of view is at least several times longer than a longest dimension of the first area of view; and optical detector means, located within said housing, for detecting relative intensity of light reflected from each of a plurality of points in one of the first and second areas of view.

35. The hand-held scanner of claim 18 wherein said movement sensor means comprises means for sensing movement along a first direction and means for sensing movement along a second direction orthogonal to the first direction.

36. A mouse-scanner for reading characters from a string of characters recorded on a substrate comprising:

a housing;

a ball rotatably mounted in said housing for rotational movement when said housing is moved over the surface of the substrate;

a first movement sensor, responsive to rotation of said ball about a first axis, for generating a first movement signal;

a second movement sensor, responsive to rotation of said ball about a second axis, for generating a second movement signal;

first optical means, located within said housing, for viewing an area of view;

optical detector means, located within said housing, for detecting the relative intensity of light reflected from each of a plurality of points in the area of view;

a microphone mounted on said housing; and wireless communication means for communicating with a host computing means so as to be able to provide the host computing means with any of signals generated through said optical detector means and signals generated through said microphone.

37. The mouse-scanner of claim 36 wherein said housing is adapted to be held by the user in the manner of a pen.

* * * * *